Nov. 24, 1953  A. R. J. HELOT  2,660,699
VARIABLE VOLTAGE DRIVE
Filed March 23, 1950  4 Sheets-Sheet 1

WITNESSES:
E. A. McCloskey
E. F. Oberhein

INVENTOR
Albert R. J. Helot.
BY Paul E. Friedemann
ATTORNEY

Nov. 24, 1953    A. R. J. HELOT    2,660,699
VARIABLE VOLTAGE DRIVE
Filed March 23, 1950    4 Sheets-Sheet 2

WITNESSES:
E.A. McCloskey
E.F. Oberheim

INVENTOR
Albert R. J. Helot.
BY
Paul E. Friedemann
ATTORNEY

Nov. 24, 1953  A. R. J. HELOT  2,660,699
VARIABLE VOLTAGE DRIVE
Filed March 23, 1950  4 Sheets-Sheet 3

INVENTOR
Albert R. J. Helot.

Nov. 24, 1953

A. R. J. HELOT 2,660,699

VARIABLE VOLTAGE DRIVE

Filed March 23, 1950

WITNESSES:

INVENTOR
Albert R. J. Helot.
BY
ATTORNEY

Patented Nov. 24, 1953

2,660,699

UNITED STATES PATENT OFFICE 2,660,699

VARIABLE VOLTAGE DRIVE

Albert René Jacques Helot, Champagne sur Seine, France, assignor to Westinghouse Electric Corporation, East Pittsburgh, Pa., a corporation of Pennsylvania Application March 23, 1950, Serial No. 151,453

6 Claims. (Cl. 318—144)

It is well known that in a Ward-Leonard set the speed of the work motor varies with the voltage of the generator which supplies it. This voltage is controlled by its excitation ampere-turns.

When a too rapid variation in the excitation current intensity of the said generator is applied, manually or automatically, there is a chance that too great a variation in the speed of the motor will be produced, a varation which may be harmful to the satisfactory operation of the electrical equipment of the machine being driven.

Accordingly, it is one object of this invention to provide a system of motor control in which acceleration of the motor is limited to predetermined values.

More specifically stated, it is also an object of this invention to provide a method and devices which make it possible to limit the acceleration of such a motor without interposing a control apparatus which carries over the speed or the acceleration of said motor into an electrical quantity.

The foregoing statements are merely illustrative of the various aims and objects of this invention. Other objects and advantages will become apparent upon a study of the following disclosure when considered in conjunction with the accompanying drawings in which Figures 1, 2 and 3 diagrammatically illustrate elementary circuit principles embodied in this invention.

Fig. 4 diagrammatically illustrates a motor control embodying the principles of this invention.

Figure 8:
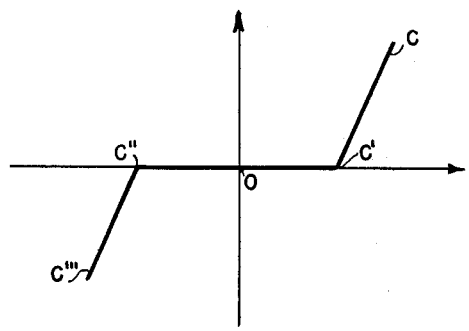
Figure 9:
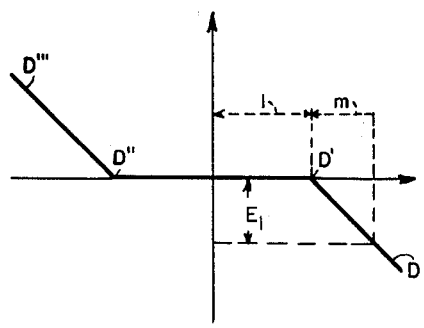

Figs. 8 and 9 graphically illustrate certain control features afforded by this invention.

Figure 7:
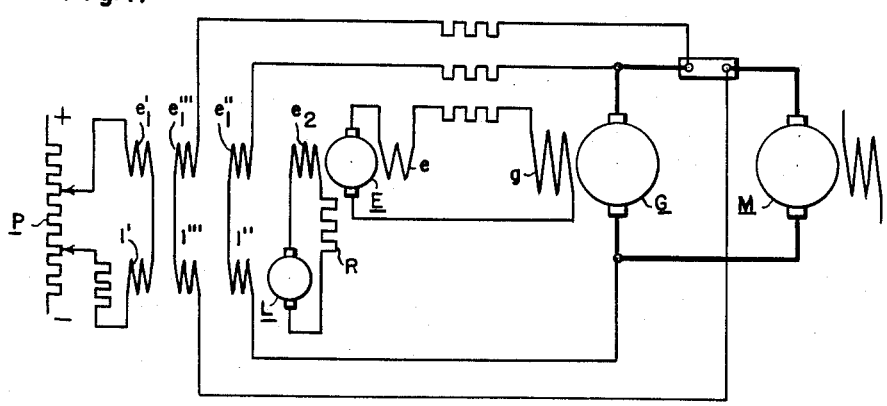
Fig. 7 illustrates the application of this invention in a circuit similar to Fig. 6.
Figure 10:
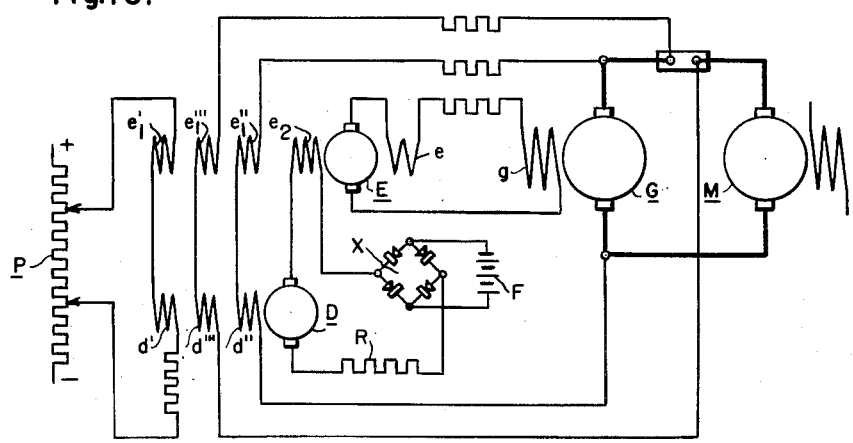

Fig. 10 is an elaboration upon the control arrangement of Fig. 7, and

Figure 11:
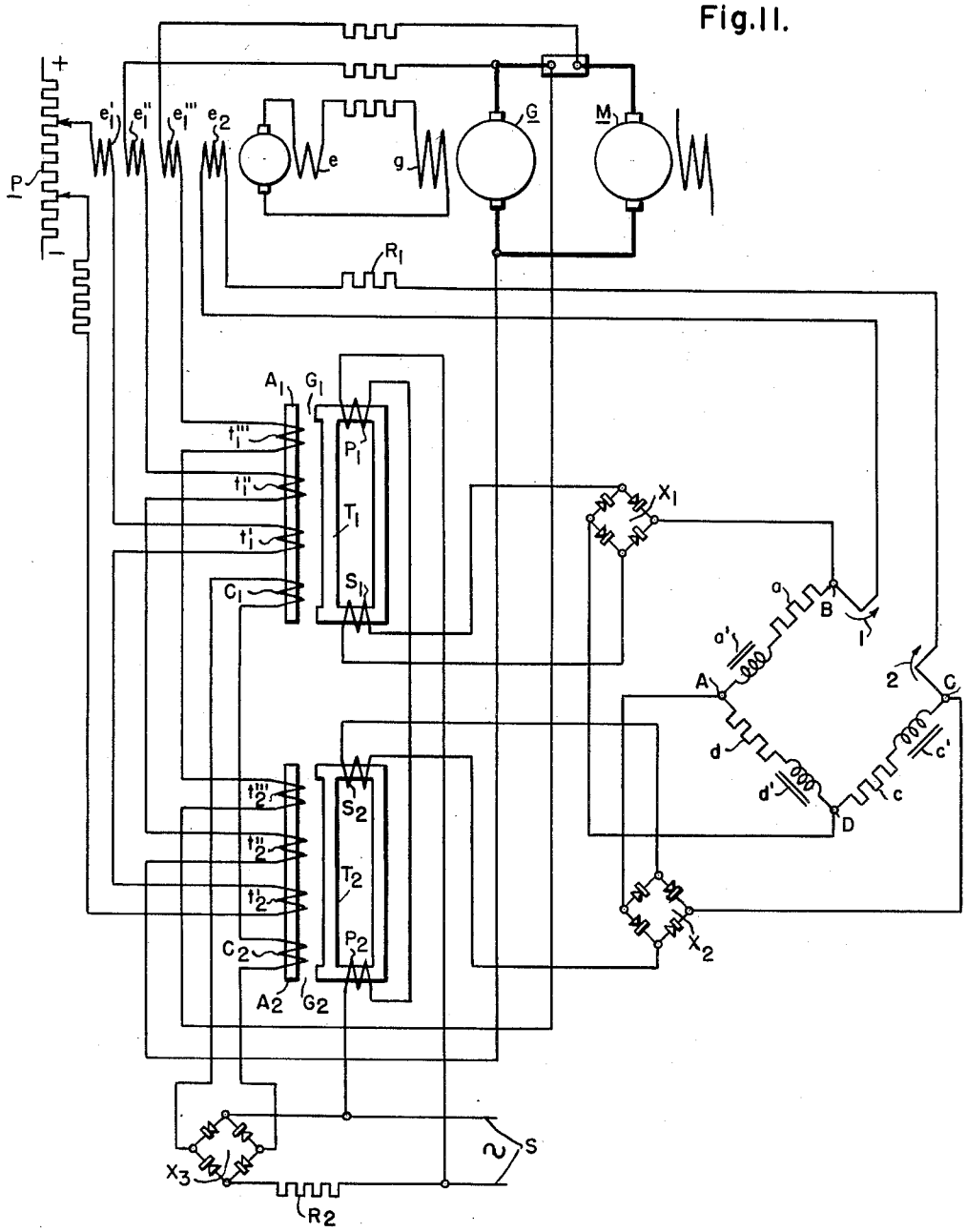

Fig. 11 diagrammatically illustrates a further embodiment of this invention.

This invention applies to motor control systems in which excitation of the generator which supplies the motor is furnished by a series self-energizing exciter whose ampere-turns of self-excitation produce an E. M. F. which strictly compensates the resistance drop in the excitation circuit of the said generator.

Figure 1:
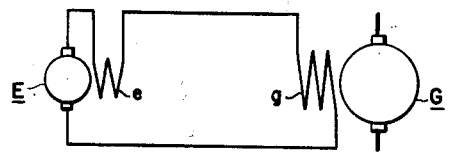

An exciter like this is made as shown in Fig. 1, in which E is the armature of the exciter, driven at constant speed, which supplies the field $g$ of the generator G (of the motor-generator set, for example). The self-excitation field winding $e$ of exciter E is connected in series with the field winding $g$ of the generator. Since the total resistance of the circuit of the exciter armature is designated by R (this circuit may or may not have one or more than one additional resistances in series with fields $e$ and $g$) and since the current flowing into this circuit is I, the voltage due to the circuit resistance is RI. Thus, the exciter E functions obligatorily on the rectilinear portion of its characteristic, and it produces an E. M. F. proportional to its excitation ampere-turns.

The self-excitation ampere-turns produced by the field are equal to $nI$, with $n$ being the number of turns in winding $e$.

The exciter, driven at constant speed, is designed in such a way that the E. M. F. produced by its self-excitation ampere turns $nI$ is equal to the voltage drop RI.

The result is that the excitation circuit of the generator G may be considered a circuit having zero ohmic resistance, since the real ohmic resistance of this circuit is strictly nullified by the self-excitation operation of the exciter E. Thus, the current I in this circuit is not determined, and, theoretically, it will retain the value to which it is brought by an intervention outside the equipment described above. This outside intervention is a supplementary E. M. F. produced in the armature E of the exciter by the action of ampere-turns added to, or subtracted from, its self-excitation ampere-turns.

Figure 2:
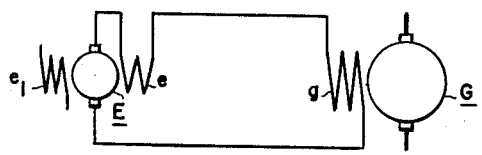
Figure 3:
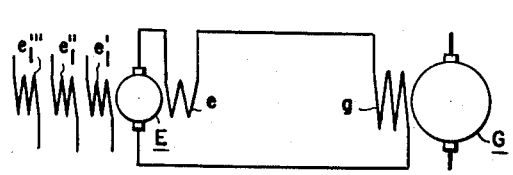

Therefore, in addition to its self-excitation winding $e$, the exciter E will include a supplementary field winding $e_1$, as Figure 2 shows, or a combination of supplementary field windings $e'_1$, $e''_1$, $e'''_1$, etc. . . . as shown in Fig. 3. It is the function of the so-called control winding or combination of windings to produce ampere-turns added to, or subtracted from, those of the self-excitation winding $e$.

Such an equipment has the following property:

$\Phi$ is the flux in the field poles of the generator G, N is the number of turns in these poles, $\mu$ is the E. M. F. produced in the armature E of the exciter by its control field winding or windings. Since, as was set forth above, the exciter E strictly compensates the ohmic potential drop RI in the circuit of its armature by its self-excitation field $e$, the application of Ohms law in this circuit leads to the following equation, if we omit the E. M. F. induced in the self-excitation winding $e$ before that induced in the excitation winding $g$ of the generator:

$$\mu = \frac{Nd\Phi}{dt} \text{ or } \frac{d\Phi}{dt} = \frac{\mu}{N}$$

The result is that, no matter what the state of saturation of the field of the generator G is, the rate of increase or decrease of the flux of the field of said generator with respect to time, is proportional to the supplementary E. M. F. $\mu$ produced in the armature E of the exciter by its control winding or windings.

The method which, with its modes of application, is the object of this invention and which makes it possible to limit the acceleration or deceleration of the motor, is based on this property.

In accordance with the invention, this result is obtained by limiting—in the field of the exciter E—the sum of the ampere-turns of the control windings and the ampere-turns of a supplementary winding for limiting acceleration, so that the E. M. F. $\mu$ produced by these windings is itself limited to a stipulated value, as a function of the characteristics of the generator G and of the limit value which has been fixed for the acceleration. The result is a limitation, not of the voltage at the brushes of this exciter, but of the rate of increase—with respect to time—of the flux of the fields of the generator supplied by this exciter.

In accordance with one way of putting this method to work, applicable to the case in which the exciter has only one control winding, the limitation of acceleration is obtained by controlling the ampere-turns of this winding by an equipment which has a reference source of direct current and a combination of rectifiers and resistors which, from a certain value on, limits the increase in current intensity in the control winding as a function of the voltage applied to the terminals of the circuit of this winding.

In accordance with a second mode of applying this method, applicable both to the case in which the exciter has only one winding and to that in which it has a combination of several control windings, the limitation of acceleration is obtained by the addition of a supplementary field winding called the acceleration-limitation field winding which opposes the ampere-turns of the control winding or windings which are equal to the difference between those resultant control ampere-turns and the stipulated limit value.

Several examples of application of this second mode (schematically drawn in Figs. 5, 7, 10 and 11 of the attached drawing and described in detail in the following description) present, in addition, certain characteristics which, of course, are a part of the invention and which will be explained, in the said description as well as in the claims listed at the end of it.

Figure 4:
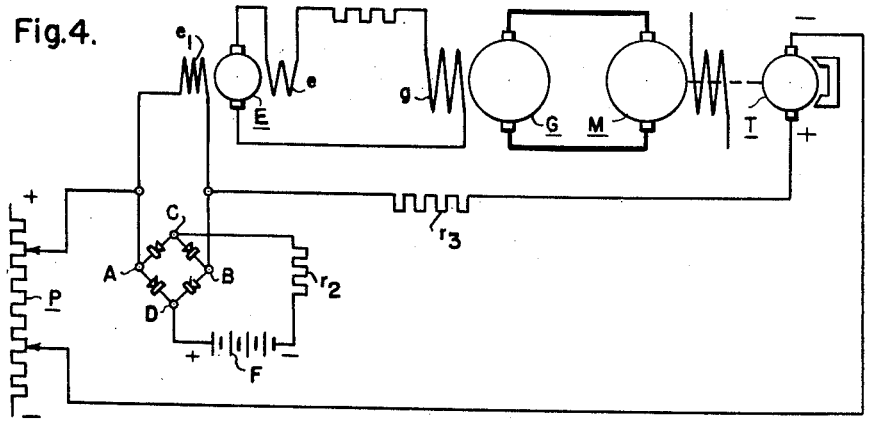

Fig. 4 is a diagram showing the application of the first mode of application of the method to an equipment in which the control winding of the self-excitation exciter is supplied by the difference between the E. M. F. of a tachometer generator having a constant field flux and driven by the controlled motor, and the voltage at the terminals of a potentiometer controlled by the operator.

In this diagram E designates the armature of the exciter, $e$ its self-excitation field winding, $e_1$ its control field winding, $g$ the field of the generator G of the motor-generator set, T the tachometer generator, and P the potentiometer.

In such an equipment, if the speed of the motor M is different from the one controlled by the operator, the control winding $e_1$ is the source of ampere-turns which produce a variation in the voltage of the exciter E and, consequently, of generator G in the direction required for the establishment of the correct value.

However, if the potentiometer P is operated too rapidly, the ampere-turns of winding $e_1$ may attain such a value that the acceleration of the motor M is too rapid.

In accordance with the invention, in order to limit the ampere-turns of winding $e_1$ the two extremities of this winding are connected to the two terminals A and B of a bridge rectifier, the other two terminals C and D of which are connected to the circuit of a reference voltage source of direct current F which may be a battery or a rectified alternating-current voltage.

If $r_1$ is the resistance of the field winding $e_1$, $r_3$ is the resistance in series with this winding in the circuit of the tachometer T and the potentiometer P, $b$ is the voltage of the reference source F, $r_2$ is the resistance of the circuit of this source, V is the difference in potential between the potentiometer and the tachometer, $v$ is the voltage at the terminals of the winding $e_1$, then:

For the condition in which V is lower than $$\frac{r_1+r_3}{r_1}xb$$

$v$ is equal to $$V x \frac{1}{1+\frac{r_3}{r_1}}$$

When V is higher than $$\frac{r_1+r_3}{r_1}xb$$

$v$ is equal to $$\frac{V+\frac{r_3}{r_2}xb}{1+\frac{r_3}{r_1}+\frac{r_3}{r_2}}$$

If V is lower than $$\frac{r_1+r_3}{r_1}xb$$

the derivative 20 of $v$ with respect to V equals $$\frac{1}{1+r_3}$$

whereas if V is higher than $$\frac{r_1+r_3}{r_1}xb$$

the derivative of $v$ with respect to V is equal to $$\frac{1}{1+\frac{r_3}{r_1}+\frac{r_3}{r_2}}$$

For a given value of the first derivative, a very low value can be obtained for the second if $$\frac{r_3}{r_2}$$

is very high with respect to 1—that is, $r_2$ is very small in comparison with $r_3$. There is thus obtained a very slight increase in $v$ above the value $b$ when V exceeds the value $$\frac{r_1+r_3}{r_1}xb$$

by a finite value.

The result is that, under normal operating conditions for the equipment, the ampere-turns of the winding $e_1$ are practically limited to the ampere-turns produced by this winding when a voltage having a value equal to $b$ is applied to it.

Figure 5:
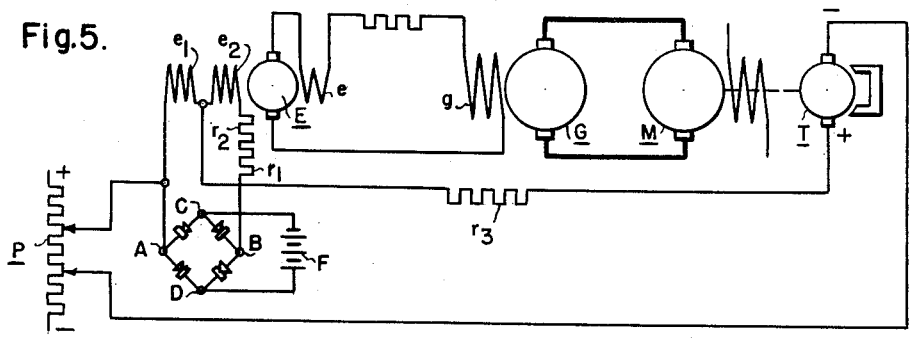
Fig. 5 is a variation of the circuit scheme of Fig. 4.

Fig. 5 is a diagram representing the application of the first form of execution of the second mode of applying the method to an equipment which is identical with the first and in which a supplementary field winding—called the acceleration-limiting winding and designated by $e_2$—is introduced.

The winding $e_2$ is supplied across the terminals of winding $e_1$ through a bridge of rectifiers ABCD, which opposes to the voltage at the terminals of winding $e_1$ the voltage $b$ of a reference source of direct current F, which may be a battery or a rectified alternating current voltage.

In order to limit the sum of the ampere-turns of windings $e_1$ and $e_2$ to the value $$n_1 \frac{b}{r_1}$$

in which $n_1$ is the number of turns in the winding $e_1$, winding $e_2$ will have $n_2$ turns and the resistance of its circuit will have a value of $r_2$ so that $$\frac{n_2}{r_2} = \frac{n_1}{r_1}$$

If the ampere-turns of the winding $e_1$ exceed the value $$n_1 \frac{b}{r_1}$$

winding $e_2$ will produce ampere-turns equal to $$(i_1 r_1 - b) \frac{n_1}{r_1}$$

in which $i_1$ is the current circulating in the winding $e_1$, and the ampere-turns resulting from the two windings $e_1$ and $e_2$ will be limited to the value $$n_1 i_1 - (i_1 r_1 - b) \frac{n_1}{r_1} = n_1 \frac{b}{r_1}$$

Figure 6:
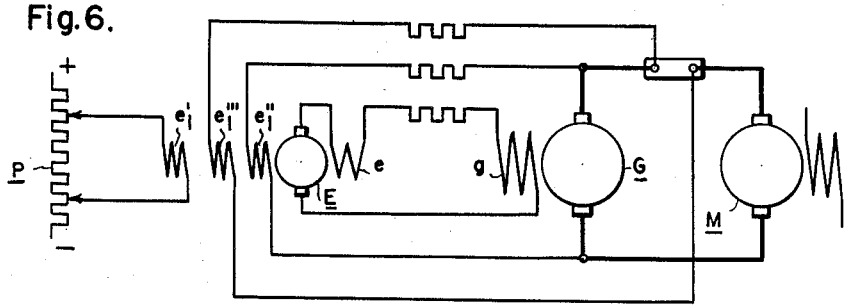
Fig. 6 illustrates certain elementary control principles embodied in this invention.

A first variant from this second manner of applying the method is shown in Fig. 7, in its application to a well-known equipment, in which the exciter has three control windings $e'_1$, $e''_1$, $e'''_1$, supplied as shown in Fig. 6.

The winding $e'_1$ is supplied by the potentiometer P which is controlled by the machinist. Winding $e''_1$ is supplied by the voltage at the terminals of the armature of generator G. Winding $e'''_1$ is supplied by the voltage at the terminals of a shunt in the Leonard circuit. Windings $e''_1$ and $e'''_1$ are combined in such a way as to produce resultant ampere-turns proportional to the E. M. F. of the motor M—that is, to the speed of the motor, the field excitation of which is a constant.

If the speed of the motor is different from the speed controlled by the operator, the aggregate of the control windings $e'_1$, $e''_1$, $e'''_1$ produces resultant ampere-turns which produce a variation in the voltage of the exciter and generator until the correct speed is established.

However, if the potentiometer is operated too rapidly, the resultant of the ampere-turns of the three windings $e'_1$, $e''_1$, $e'''_1$ may attain such a value that the acceleration of the motor is too great.

In accordance with this first variant, in order to limit acceleration, the winding $e_2$ is supplied by the armature L of a dynamo, as shown in the diagram of Fig. 7. The armature L of this dynamo is a standard armature driven at constant speed, which supplies winding $e_2$ through resistor R.

The field of the dynamo L has a combination of saturable magnetic shunts (not shown) and field windings $l'$, $l''$, $l'''$, mounted, respectively, in series with each of the windings $e'_1$, $e''_1$, $e'''_1$ of the exciter E.

The resultant of the ampere-turns of the windings $l'$, $l''$, and $l'''$ is proportional to the resultant of windings $e'_1$, $e''_1$, $e'''_1$.

The characteristics of the limiting dynamo L are such that the characteristic curve of the voltage at the brushes of its armature as a function of its total excitation ampere-turns is a curve having the shape of $C'''$, $C''$, $C'$, C, shown in Fig. 8, symmetrical with respect to the origin O of the axes, with the ampere-turns in the abscissae.

In the course of operation, if the excitation ampere-turns of the limiting dynamo L have a value somewhere between $OC''$ and $OC'$, the voltage at the brushes of this dynamo is zero. If the ampere-turns in question are higher than the absolute value $OC'$ or $OC''$, a voltage appears at the terminals of the armature, in one direction or another, depending on the direction of excitation, and for any ulterior increase in the excitation ampere-turns this voltage is a linear function of these ampere-turns.

The result is that the ampere-turns produced by the limiting dynamo L in the limitation-winding $e_2$ of the exciter will be a function of the ampere-turns resulting from the aggregate of the control windings $e'_1$, $e''_1$, $e'''_1$ of this exciter, and this function may be represented, as is seen in Fig. 9, by a characteristic curve like $D'''$, $D''$, $D'$, D, in which the said resulting ampere-turns are in abscissae.

If 1 designates the maximum value of the sum of the ampere-turns of the control windings $e'_1$, $e''_1$, $e'''_1$, and limitation winding $e_2$ to be admitted to the exciter E, this characteristic evidences the following properties:

(a) The ampere-turns of $e_2$ are zero if the resultant of the ampere-turns of $e'_1$, $e''_1$, $e'''_1$ is lower in absolute value than the value 1.

(b) Starting from the value 1, the ampere-turns of $e_2$ vary linearly with the resultant of the ampere turns of $e'_1$, $e''_1$, $e'''_1$, and the angle of the straight characteristic with the axis of the ampere-turns resulting from $e'_1$, $e''_1$, $e'''_1$ is equal to $$\frac{\pi}{4}$$

Thus, if the resultant of the control ampere-turns of the exciter E is $m$ higher than the value 1, the limiting dynamo produces (in winding $e_2$) ampere-turns the value of which equal $-m$, consequently these ampere-turns of winding $e_2$ nullify the excess $m$ of the control ampere-turns, so that the resultant of the ampere-turns of control windings $e'_1$, $e''_1$, $e'''_1$ and of the limitation winding $e_2$ has the value 1.

Thus, the sum of the ampere-turns of the control and limitation windings is limited to the value 1 regardless of the value of the resultant of the ampere-turns of the control windings in exciter E.

The limit value of this resultant may be modified by causing a variation in the ratio of the ampere-turns in windings $e'_1$, $e''_1$, $e'''_1$ on the one hand, and of windings $l'$, $l''$, $l'''$ on the other hand, and by modifying the characteristics of the circuit of winding $e_2$ at the same time, so as to maintain the angle $\pi/4$ which the characteristic wave shown in Fig. 9 makes with the axis of the control ampere-turns.

The second variant of the second mode of putting the method to work may, for example, be applied to an equipment in which the exciter has three control windings, as shown in Fig. 6. This application is shown by the diagram in Fig. 10.

In accordance with this variant, the limitation winding $e_2$ is supplied by the armature of a limiting dynamo D in order to limit acceleration.

This dynamo D is a standard dynamo, driven at constant speed and excited by $d'$, $d''$, and $d'''$, of which the result of the ampere-turns is proportional to the resultant of the ampere-turns in windings $e'_1$, $e''_1$, $e'''_1$ of the exciter.

In order to obtain the proper flow characteristic of this generator, the winding $e_2$ is supplied by the armature D through a resistor R and, in the circuit of winding $e_2$, there is inserted a bridge rectifier K which opposes to the voltage of the limiting armature D the voltage of a direct-current reference source F, such as a battery of accumulators or a rectified alternating-current voltage.

This variant furnishes the same characteristic as that shown in Fig. 9, and it makes it possible to modify the regulation of the limit value of the resultant of the control and limitation ampere-turns by the single variation in the voltage of the source F.

The third variant of the second mode of applying the method is applied, for example, to an equipment in which the exciter has three windings as shown in Fig. 6. This application is shown on the diagram in Fig. 11.

In accordance with this variation, in order to limit the acceleration the limitation-winding $e_2$ is supplied with rectified alternating current through an equipment which has two saturable transformers $T_1$ and $T_2$, rectifier bridges $X_1$, $X_2$, $X_3$ and suitably arranged resistors.

The winding $e_2$ with its resistor $R_1$ in series forms the arm BC of a bridge ABCD; the other three arms, AB, CD, and DA are each made up of a resistor and an inductance which have the same value as the resistor and field winding inductance in the circuit BC. The transformers $T_1$ and $T_2$ have their primary windings $P_1$ and $P_2$ fed in series by a source of alternating-current voltage S, which has a constant effective value.

The secondary $S_1$ of the transformer $T_1$ through the intermediary of a bridge of rectifiers $X_1$ in the bridge ABCD feeds the peaks B and D of the bridge ABCD to which it is connected in such a way as to produce, in arm BC, a current in the direction of the arrow $i$.

The secondary $S_2$ of the transformer $T_2$, through a bridge of rectifiers $X_2$, feeds the peaks A and C of the bridge ABCD to which it is connected in such a way as to produce, in arm BC, a current in the direction of arrow 2.

Since the two transformers $T_1$ and $T_2$ have the same characteristics the two currents fed by their secondaries would be nullified constantly in the arm BC of the bridge ABCD and no current would flow in the limitation winding $e_2$. In order to produce a current in $e_2$ which is suitable for the desired limitation, each of the transformers $T_1$ and $T_2$ has saturation windings, supplied with direct current and wound on cores $A_1$ and $A_2$ whose magnetic circuits close on the chief magnetic circuit of each of the transformers through adjustable air gaps $G_1$ and $G_2$. Thus core $A_1$ has windings $t'_1$, $t''_1$, $t'''_1$ and core $A_2$ has windings $t'_2$, $t''_2$, and $t'''_2$ connected in series, respectively, with windings $e'_1$, $e''_1$, and $e'''_1$.

The aggregate of $t'_1$ and $t'_2$ is connected in series with winding $e'_1$ of the exciter E, and the aggregate of $t''_1$ and $t''_2$ is connected in series with the control winding $e''_1$, while the aggregate of $t'''_1$ and $t'''_2$ is connected in series with the control winding $e'''_1$.

In addition, the two cores $A_1$ and $A_2$ each have a polarization winding $C_1$ and $C_2$, respectively, both supplied with direct current through a bridge rectifier $X_3$, a resistor $R_2$, through the alternating-current source S.

The resultant of the ampere-turns of $t'_1$, $t''_1$, and $t'''_1$ is proportional to the resultant of the ampere-turns of $e'_1$, $e''_1$, and $e'''_1$.

In the same way, the resultant of the ampere-turns of $t'_2$, $t''_2$, and $t'''_2$ is proportional to the resultant of the ampere-turns of $e'_1$, $e''_1$, and $e'''_1$.

The windings $C_1$ and $C_2$ are such that, when the ampere-turns of $C_1$ are going in the same direction as the resultant of the ampere-turns of $t'_1$, $t''_1$, and $t'''_1$ on the core $A_1$ of transformer $T_1$ the ampere-turns of $C_2$ are going in the direction opposite to the resultant of the ampere-turns of $t'_2$, $t''_2$, and $t'''_2$ on core $A_2$ of transformer $T_2$.

As long as the sum of the ampere-turns on the cores $A_1$ and $A_2$ is lower than the quantity required for the saturation of their magnetic circuit, the current in the winding $e_2$ remains zero.

If the resultant of the ampere-turns of $C_1$ and of $t'_1$, $t''_1$, $t'''_1$ saturates the transformer $T_1$, the resultant of the ampere-turns of $C_2$ and $t'_2$, $t''_2$, $t'''_2$ will be insufficient to saturate transformer $T_2$ because when the action of $C_1$ is added to that of the aggregate $t'_1$, $t''_1$, $t'''_1$ on core $A_1$, on core $A_2$ the action of $C_2$ is retrenched by that of the aggregate of $t'_2$, $t''_2$, $t'''_2$.

Inversely, when the action of the ampere-turns of $C_2$ is added to that of the aggregate $t'_2$, $t''_2$, $t'''_2$ on the core $A_2$, the action of $C_1$ is retrenched by that of the aggregate $t'_1$, $t''_1$, $t'''_1$ on core $A_1$.

Starting from a certain absolute value of the resultant of the ampere-turns of $e'_1$, $e''_1$, $e'''_1$ if this resultant is in one direction there is saturation of the transformer $T_1$, and if it goes in the opposite direction there is saturation of the transformer $T_2$.

When the transformer $T_1$ is saturated, on the one hand, the voltage at the terminals of its primary $P_1$ becomes lower than the voltage at the terminals of the primary $P_2$ of the transformer $T_2$, as a result of the diminution of impedance of $P_1$ with respect to that of $P_2$; on the other hand, the ratio between the secondary voltage and the primary voltage of transformer $T_1$ will diminish as a result of the saturation of its magnetic circuit. The current fed by $S_1$ into the bridge ABCD will diminish whereas the current fed by $S_2$ into this same bridge will increase. The result will be a current in the direction of arrow 2, in arm B—$e_2$—C.

The saturation of the transformer $T_2$ will produce the contrary phenomenon, which will produce a current in the direction of arrow 1 in the arm B—$e_2$—C.

The aggregate of the limitation equipment described above thus makes it possible to obtain—as a function of the resultant of the ampere-turns of the control windings of the exciter—a characteristic of the ampere-turns of the winding $e_2$, which is identical with that shown in Fig.

9, the result of which is limitation to the value 1 of the resultant of the ampere-turns of windings $e'_1$, $e''_1$, $e'''_1$ and $e_2$.

The invention as it has been described with reference to the attached drawings offers the following advantages:

It does not necessitate measurement of the speed of the motor or of its derivate; thus, it does not correct any excessively great acceleration or deceleration which might be produced, but it does eliminate the cause. It permits speedy operation of the speed-control device without risking prejudicial acceleration or deceleration. It permits simplification of an ordinary automatic control equipment because in such an equipment it is usually necessary to control gradually the increase or diminution of the speed in order to accomplish the imposed cycle; on the contrary, the means in accordance with the invention make it possible to order, suddenly, a great variation in speed from one value to another since the progressive variation up to the desired value is imposed by the acceleration-limiting equipment; this variation can, moreover, be more or less rapid depending on the limitation-value chosen as a function of the work conditions of the machine being driven.

The foregoing disclosure and the showings made in the drawings are merely illustrative of the principles of this invention and are not to be interpreted in a limiting sense.

I claim as my invention:

1. In a variable voltage drive equipment of the type including a variable speed motor, said motor having a constant field excitation, a generator supplying power to said motor armature, an exciter supplying said generator field winding, said exciter having at least one separate field energizing winding in order to regulate the speed of said motor and having a field series self energizing winding in order to increase the speed regulation accuracy, said self-energizing winding having ampere turns which, if alone, would produce an E. M. F. which strictly compensates the ohmic voltage drop in the field energizing circuit of said generator, the combination therewith of a supplementary acceleration limiting winding on said exciter and means for limiting the acceleration or deceleration of said motor by limitation of the value of the algebraic sum of the ampere turns of said separate energizing windings and of said supplementary acceleration limiting winding on said exciter to a predetermined value, this predetermined value being the value which produces the rate of change with respect to time of the flux of said generator in accordance with the maximum fixed value of acceleration or deceleration.

2. In a variable voltage drive equipment of the Ward-Leonard type including a variable speed motor having a constant field excitation, a generator supplying power to said motor armature, an exciter supplying said generator field winding and having a self-exciting winding, the self-exciting electromotive force of said exciter balancing the ohmic voltage drop in the inductor circuit of said generator, the combination therewith of means for limiting the acceleration or deceleration of said motor comprising a plurality of control inductor windings for the exciter additional to said self-exciting winding; a potentiometer connected to one of said control windings for supplying a variable voltage thereto, another of said control windings being connected through a resistance across the armature of said generator, and another of said control windings being connected through a resistance to the terminals of a shunt in the Leonard system, said last named two control windings producing resultant ampere turns which are proportional to the electromotive force of said motor.

3. In a variable voltage drive equipment of the type including a variable speed motor, said motor having a constant field excitation, a generator supplying power to said motor armature, an exciter supplying said generator field winding, said exciter having one separate field energizing winding which is series connected with a potentiometer and a constant flux tachometer geared with said motor so as to supply said separate energizing winding with the difference between the terminal voltage of the potentiometer and the voltage of the tachometer and said exciter having a field series self energizing winding whose ampere turns, if alone, would produce an E. M. F. which strictly compensates the ohmic voltage drop in the field energizing circuit of said generator, the combination therewith of means for limiting the acceleration or deceleration of said motor comprising a supplementary field energizing winding on said exciter, said supplementary energizing winding being supplied by the voltage across the terminals of said separate energizing winding through a circuit in which said supplementary energizing winding, a resistance and a rectifier bridge are series connected, said rectifier bridge being connected on another side through a resistance in the circuit of a reference source of direct current so that said rectifier bridge opposes the terminal voltage of said separate energizing winding through said supplementary energizing winding with the voltage of said reference source and permits current to flow in said exciter supplementary winding in order to produce ampere turns which subtract from the ampere turns of said separate energizing winding only if the ampere turns of said exciter field separate energizing winding are greater than a stipulated value, this stipulated value being the value which produces the rate of change with respect to time of the flux of said generator in accordance with the maximum fixed value of acceleration or deceleration.

4. In a variable voltage drive equipment of the type including a variable speed motor, said motor having a constant field excitation, a generator supplying power to said motor armature, an exciter supplying said generator field winding, said exciter having three separate field exciting windings, the first of these windings being connected to a potentiometer, the second being connected to the terminals of a resistor which is itself series connected with said motor armature, the third being connected to the brushes of said generator so as to produce by these second and third of said separate energizing windings ampere turns which are directly proportional to the C. E. M. F. of said motor and said exciter having a field series self energizing winding whose ampere turns, if alone, would produce an E. M. F. which strictly compensates the ohmic voltage drop in the field energizing circuit of said generator, the combination therewith of means for limiting acceleration or deceleration of said motor comprising a supplementary field energizing winding on said exciter, said supplementary field energizing winding being supplied by the voltage of the constant speed armature of a special dynamo, the field of said special dynamo being energized by windings, the number of which is equal to that of the field separate energizing windings of said exciter with which they are respectively series connected, the ampere turns of said special dynamo field windings being directly proportional to those of the field separate energizing windings of said exciter, the field of said special dynamo comprising a combination of saturable magnetic shunts located between its main poles, magnetic shunts which permit a voltage to appear on said dynamo armature and a current to flow in said exciter supplementary winding in order to produce ampere turns which subtract from the alegbraic sum of the ampere turns of said exciter separate energizing windings only if the absolute value of the algebraic sum of the ampere turns of said exciter field separate energizing windings are greater than a stipulated value, this stipulated value being the value which produces the rate of change with respect to time of the flux of said generator in accordance with the maximum fixed value of acceleration or deceleration.

5. In a variable voltage drive equipment of the type including a variable speed motor, said motor having a constant field excitation, a generator supplying power to said motor armature, an exciter supplying said generator field winding, said exciter having three separate field exciting windings, the first of these windings being connected to a potentiometer, the second being connected to the terminals of a resistance which is itself series connected with said motor armature, the third being connected to the brushes of said generator so as to produce by these second and third of said separate energizing windings ampere turns which are directly proportional to the C. E. M. F. of said motor and said exciter having a field series self energizing winding whose ampere turns, if alone, would produce an E. M. F. which strictly compensates the ohmic voltage drop in the field energizing circuit of said generator, the combination therewith of means for limiting acceleration or deceleration of said motor comprising a supplementary field energizing winding on said exciter, said supplementary field energizing winding being supplied by the armature voltage of a standard type constant speed dynamo, the field of said dynamo being energized by windings, the number of which is equal to that of the field separate energizing windings of said exciter, with which they are respectively series connected, the ampere turns of said dynamo field windings being directly proportional to those of the field separate energizing windings of said exciter, said exciter supplementary winding being series connected with a resistor, a rectifier bridge and said dynamo armature, said rectifier bridge being connected on another side in a circuit comprising a reference source of direct current, so that said rectifier bridge opposes the voltage of said dynamo armature with the voltage of said reference source and permits a current to flow in said exciter supplementary winding in order to produce ampere turns which subtract from the algebraic sum of the ampere turns of said exciter separate energizing windings only if the absolute value of the algebraic sum of the ampere turns of said exciter field separate energizing windings are greater than a stipulated value, this stipulated value being the value which produces the rate of change with respect to time of the flux of said generator in accordance with the maximum fixed value of acceleration or deceleration.

6. In a variable voltage drive equipment of the type including a variable speed motor, said motor having a constant speed excitation, a generator supplying power to said motor armature, an exciter supplying said generator field winding, said exciter having three separate field exciting windings, the first of these windings being connected to a potentiometer, the second being connected to the terminals of a resistance which is itself series connected with said motor armature, the third being connected to the brushes of said generator so as to produce by these second and third of said separate energizing windings ampere turns which are directly proportional to the C. E. M. F. of said motor and said exciter having a field series self energizing winding whose ampere turns, if alone, would produce an E. M. F. which strictly compensates the ohmic voltage drop in the field energizing circuit of said generator, the combination therewith of means for limiting acceleration or deceleration of said motor comprising a supplementary field energizing winding on said exciter, said supplementary field energizing winding being inserted in a leg of a resistance and reactance bridge each of the other three legs of said bridge consisting of a resistance and an inductance of the same value respectively as the resistance and inductance of the leg which includes said supplementary limiting winding, said bridge being supplied by the secondary windings of two transformers through two rectifier bridges, each of these two transformers having saturable cores which are energized by a constant direct current winding and other windings the number of which is equal to that of the field separate energizing winding of said exciter, with which they are respectively series connected, the ampere turns of said other windings being directly proportional to those of the field separate energizing windings of said exciter, said constant direct current windings on each core acting in opposite direction so that if the ampere turns of a constant direct current winding on one core add to that of the other windings, the ampere turns of the other constant direct current winding on the other core subtract from those of the other windings, the primary windings of said two transformers being series supplied by a constant voltage alternate current source and the secondary windings of said two transformers supplying, through said rectifier bridges and said resistor and reactance bridge, said exciter supplementary winding in opposite directions so that a current will flow in this supplementary winding in order to produce ampere turns which subtract from the algebraic sum of the ampere turns of said exciter separate energizing windings only if the absolute value of the algebraic sum of the ampere turns of said exciter field separate energizing windings are greater than a stipulated value, this stipulated value being the value which produces the rate of change with respect to time of the flux of said generator in accordance with the maximum fixed value of acceleration or deceleration.

ALBERT RENÉ JACQUES HELOT.

References Cited in the file of this patent

UNITED STATES PATENTS

| Number | Name | Date |
|---|---|---|
| 1,060,208 | Osborne | Apr. 29, 1913 |
| 2,220,644 | Gietmann | Nov. 5, 1940 |
| 2,308,993 | Nickey | Jan. 19, 1943 |
| 2,323,741 | Watson | July 6, 1943 |
| 2,431,252 | Hornbarger | Nov. 18, 1947 |
| 2,486,295 | King | Oct. 25, 1949 |